United States Patent [19]
Morehead, Jr.

[11] Patent Number: 5,082,210
[45] Date of Patent: Jan. 21, 1992

[54] PARACHUTE CANOPY

[76] Inventor: Leonard E. Morehead, Jr., 911 Lazy La., Bryan, Tex. 77802

[21] Appl. No.: 544,913

[22] Filed: Jun. 28, 1990

[51] Int. Cl.⁵ .............................................. B64D 17/02
[52] U.S. Cl. .................................................. 244/145
[58] Field of Search ........................ 244/142, 145, 146

[56] References Cited

U.S. PATENT DOCUMENTS 3,724,789  4/1973  Snyder ................................. 244/145
4,705,238  11/1987  Gargano ............................. 244/145

FOREIGN PATENT DOCUMENTS 2141079  12/1984  United Kingdom ............... 244/145

Primary Examiner—Galen Barefoot
Attorney, Agent, or Firm—Arthur G. Yeager

[57] ABSTRACT

An improved canopy for a ram air parachute wherein the canopy contains a mixture of cells having different lateral cross sectional shapes, including wedge-shapes, arranged in sequential order and directionally oriented into a nonlinear distortion which will straighten into a linear configuration when in use with a pay load suspended therefrom.

20 Claims, 3 Drawing Sheets

PARACHUTE CANOPY

CROSS-REFERENCE

This application is based on a previously filed Document Disclosure No. 230669, filed July 6, 1989.

BACKGROUND OF THE INVENTION

Parachutes, previously used as a means for transferring persons and equipment from an airship to the ground have in more recent times, been employed by sky diving sports persons in situations where an improved maneuverability is desired. Accordingly, new types of parachutes have been developed, the most common of which is a ram air parachute. This new improvement has changed the shape of the parachute canopy from an umbrella to an airfoil, e.g., a section of an airplane wing. The entire structure is made of fabric that can be collapsed and packed into a parachute bag that can be carried on the human body by means of a harness attach to the bag and strapped around the shoulders and legs of the wearer. The structure of the parachute canopy is similar to a plurality of tubes laid side-by-side. When this structure moves through the air a direction lengthwise of the tubes, they become inflated and the canopy looks like a floating mattress. By appropriate placement and sizing of the openings leading into the tubes and by closing the trailing ends of the tubes the structure is readily inflated to a reasonably stable airfoil. There is a well-known phenomenon of compressing air by means of a ram principle whereby a container or a tubular object can be passed through the air at a high velocity and it will cause the air to be compressed because of the friction between the air and the container or tubular object. This principle is employed in the present invention to inflate the parachute canopy. Various designs and improvements on such a parachute canopy have been patented, e.g., U.S. Pat. Nos. 3,724,789; 3,749,337; 4,363,458; 4,470,567; 4,771,970; and 4,811,920. The present invention is intended to provide an improved design which is more maneuverable and less complex than the prior art designs.

It is an object of this invention to provide an improved ram air inflated parachute. It is another object of this invention to provide such a parachute with an improved maneuverability. It is still another object of this invention to provide a simpler apparatus than any from the prior art. Still other objects will become apparent from the more detailed description which follows.

BRIEF SUMMARY OF THE INVENTION

This invention relates to a ram air inflatable glidable parachute, a generally horizontal canopy and a plurality of generally vertical suspension lines connecting said canopy to a pay load attachment means, said canopy having a horizontal top skin vertically spaced above a horizontal bottom skin, said top and bottom skins being connected to each other by a plurality of horizontally spaced vertical wall skins structured into a plurality of tubular contiguous cells having generally an airfoil shape in longitudinal cross section extending from a leading edge to a trailing edge; with an opening near said leading edge to permit air to flow into said cell from the surrounding atmosphere; the improvement which comprises said canopy cells being arranged in cell clusters of two or more contiguous cells between adjacent said suspension lines, the cells in each said cluster being mixtures of different cells each having the general lateral cross sectional shape of a polygon of 3-5 sides; the orientation and arrangement of said cells in said cell clusters and the canopy attachment positions of said suspension lines being such that when in use gliding through the air with said pay load suspended thereebeneath, said canopy is substantially horizontal.

In specific and preferred embodiments of this invention the cell clusters have a wedge-shaped cell at each end thereof with the apex or narrow portion of the wedge at the horizontal bottom skin; and in the middle portion of the cluster have at least one wedge-shaped cell having its apex or narrow portion at the horizontal top skin; and have an aspect ratio of at least 0.5. Since a parachute normally has at least 5 cell clusters, the overall aspect ratio for the parachute is at least 5×0.5 or 2.5.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
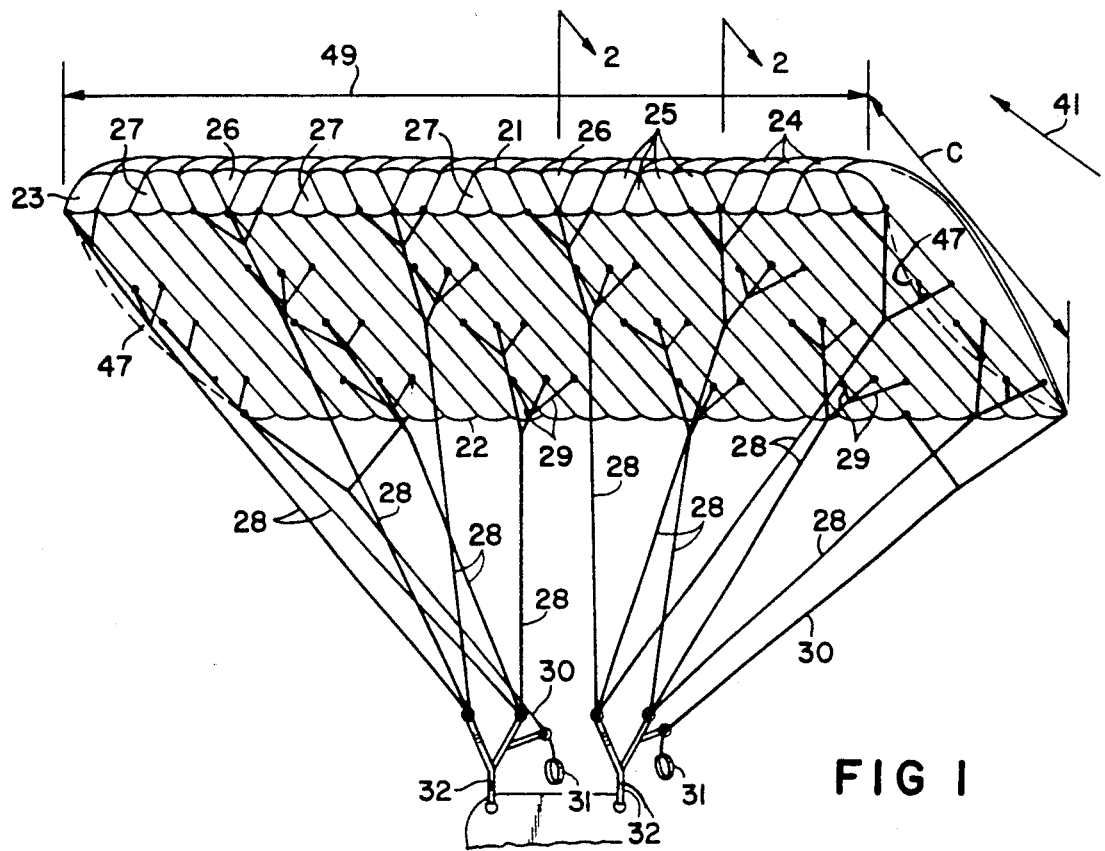
FIG. 1 is a perspective view of a parachute of this invention.
Figure 2:
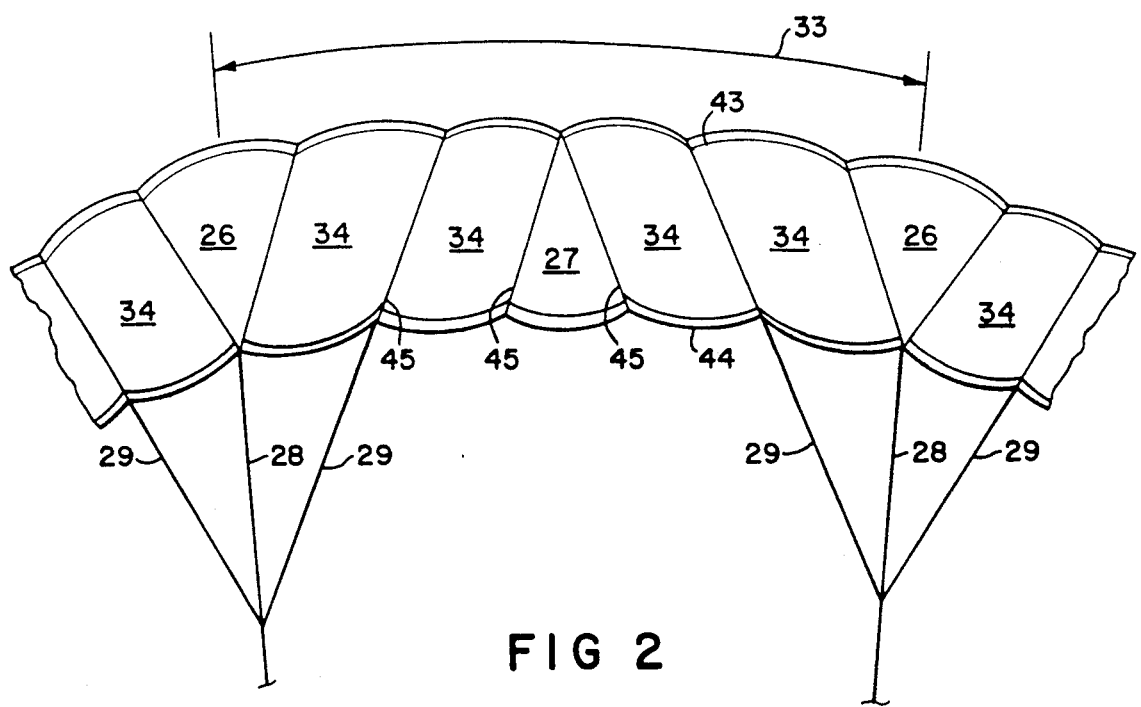
FIG. 2 is a partial cross sectional view taken at 2—2 of FIG. 1 when in use with a pay load attached thereto.
Figure 3:
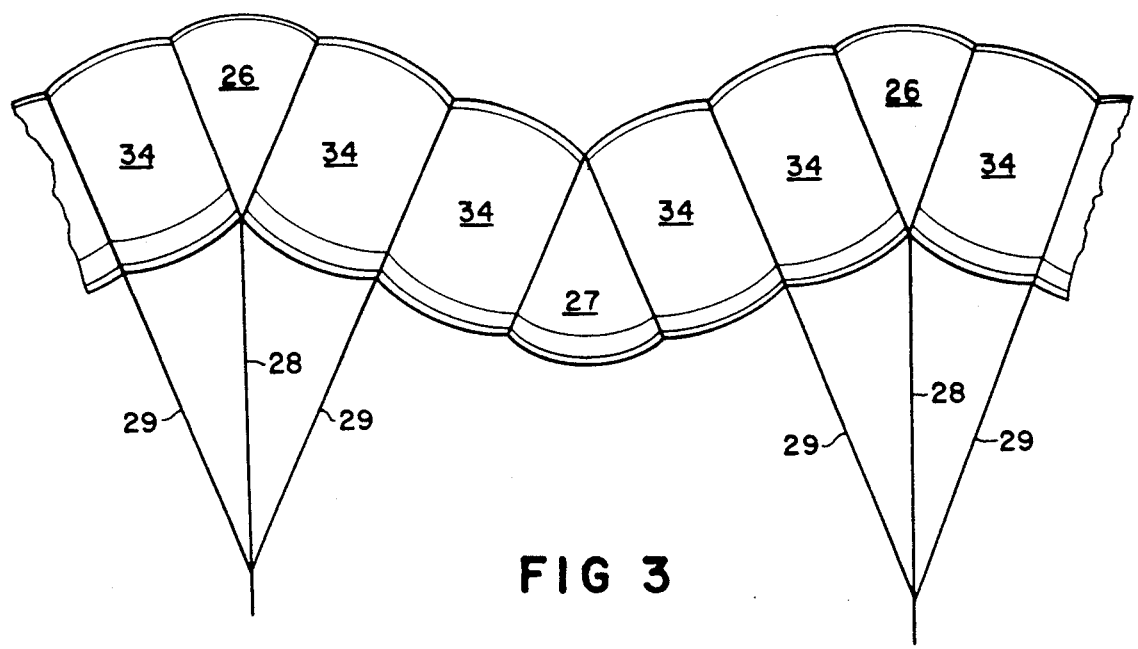
FIG. 3 is a partial cross sectional view taken at 2—2 of FIG. 1 when there is no pay load attached showing the general shape before the deformation which occurs when the pay load is attached.
Figure 4:
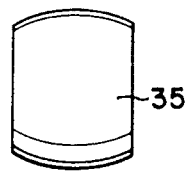
FIG. 4 is a cross sectional view of a rectangular cell.
Figure 5:
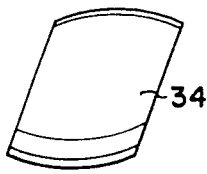
FIG. 5 is a cross sectional view of a shear cell inclined to the right.
Figure 6:
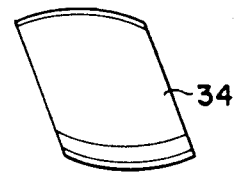
FIG. 6 is a cross sectional view of a shear cell inclined to the left.
Figure 7:
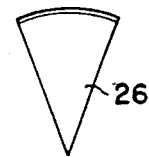
FIG. 7 is a cross sectional view of a triangular wedge cell.
Figure 8:
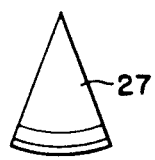
FIG. 8 is a cross sectional view of an inverted triangular wedge cell.
Figure 9:
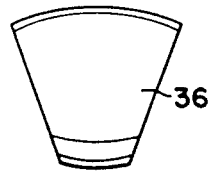
FIG. 9 is a cross sectional view of a trapezoidal wedge cell.
Figure 10:
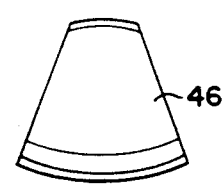
FIG. 10 is a cross sectional view of an inverted trapezoid wedge cell.
Figure 11:
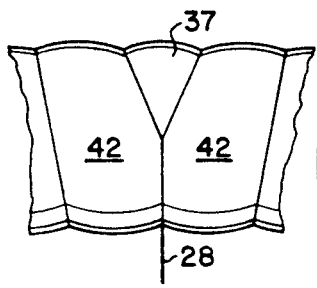
FIG. 11 is a cross sectional view of a Y-wedge cell between two modified shear cells.
Figure 12:
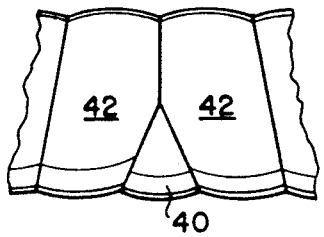
FIG. 12 is a cross sectional view of an inverted Y-wedge cell between two modified shear cells.
Figure 13:
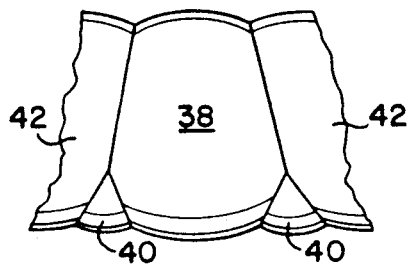
FIG. 13 is a cross sectional view of two inverted Y-wedge cells in combination with a keystone cell and two modified shear cells.
Figure 14:
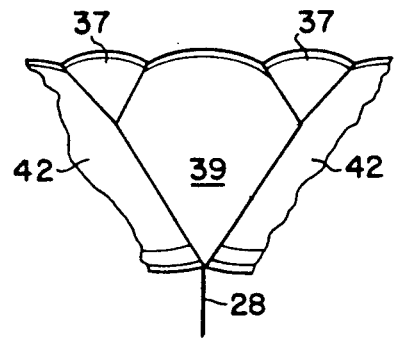
FIG. 14 is a cross sectional view of two Y-wedge cells in combination with a pointed keystone cell and two modified stress cells.

The features of this invention are best understood by reference to the attached drawings. In FIGS. 1–3 there is illustrated the parachute of this invention, principally comprising a canopy 20 and a plurality of suspension lines 28 connecting canopy 20 to a harness 32 for attachment to a pay load which the parachute transports from an airship to the earth. The pay load normally of course, is a human or any inanimate object.

The canopy 20 is a collapsible fabric or foil structure of a plurality of tubular cells 24 in a side-by-side arrangement that is generally rectangular in a plan view from above or below and having a thickness of about 6-15 inches. It has frequently been described as resembling a mattress. The shape of the cells 24, and, therefore, the entire canopy structure as viewed from either side 23 is that of a smoothly curving airfoil having a rounded blunt nose at the leading edge 21 and a thin tapered tail at the trailing edge 22. In general, the shape of the canopy 20 is similar to a section cut from an airplane wing. Each cell 24 has an open front end 25 and is closed at the trailing edge 22. The parachute is intended to glide through the air in the direction of arrow 41 which is substantially the same direction as a longitudinal central axis of each cell 24. Therefore as canopy 20 moves through the air each cell 24 is inflated by the pressure of the air entering each cell through open front 25 as in a ram jet engine. Various designs of the open front 25, of openings in the walls between adjacent cells, and of valve means for controlling the internal pressure are the subjects of various patents of the prior art. None of such patents is of importance to the present invention which is not concerned with the particular means for inflating canopy 20.

Canopy 20 is connected to the object to be transported by means of harness 32 and a plurality of suspension lines 28, which are attached directly to canopy 20. In order to distribute the weight it is preferable to employ branch support lines 29 so as to make three connections to canopy 20 for every suspension line 28. The points of connection for suspension lines 28 and branch support lines 29 are distributed as evenly as possible across the length and breadth of canopy 20. Another set of lines 30 are attached to trailing edge 22 and converged to two rings 31 or other manually appropriate articles. Lines 30 are brake lines and are used by a person in harness 32 to help to maneuver the parachute. Two stabilizer sheets 47 are shown in dotted lines depending downwardly from each side 23, respectively. These are optional and are not necessary components. When used they are attached to one or more suspension lines 28.

The cells 24 of canopy 20 are preferably made from a soft tightly woven fabric, e.g., nylon or polyester, or from a film, e.g., polyethylene, nylon, polyester, etc. The cell structure is formed from a single top horizontal layer or skin 43, a single bottom horizontal layer or skin 44, and a plurality of generally vertical wall skins 45. It is, of course, to be understood that since these layers or skins 43, 44, and 45 are flexible, the terms "horizontal" and "vertical" are more idealistic than real. Nevertheless, top and bottom skins 43 and 44 are intended to define the top and bottom surfaces of canopy 20 which must be mostly horizontal if it is to serve as an airfoil which glides through the air to eventually settle on the earth. Similarly, wall skins 45 are generally perpendicular to top and bottom skins 43 and 44 and must be considered, in the broadest sense, to be vertical, although at any one time they may be inclined many degrees away from vertical. In order to make canopy 20 as light in weight as possible, each wall skin 45 serves as a single wall for the two cells adjacent to that wall. Each cell 24 is, therefore, not an entity that can be separated from the remainder of canopy 20, but in reality is only a space surrounded by walls that may be common to other cell spaces.

The cells in the canopy of this invention are made in many different shapes as are shown in detail in FIGS. 4-14. Some of these shapes are referred to herein as "wedge cells" because they are shaped like wedges. Such cells are shown in FIGS. 7-14, as triangles, trapezoids, or Y-shapes. The purpose for using wedge cells in the canopy of this invention is to provide a canopy structure which will approach the idealistic shape of a thin, flat mattress having an airfoil shape from leading edge 21 to trailing edge 22. It will be appreciated that as soon as a weight is suspended in a harness 32 beneath a flat canopy 20 of a conventional design, the flat shape of canopy 20 is destroyed. The weight will pull downwardly on suspension lines 28 which will pull canopy 20 downwardly where each suspension line 28 is attached to canopy 20. The reaction to the downward force on a conventional canopy 20 at the points of connection to suspension lines 28, is for a canopy 20 to arch upwardly between adjacent points of connection. The resulting shape of canopy 20 is not desirable for the best maneuverability of the parachute. Accordingly, the main feature of this invention is to predistort the shape of canopy 20 so that when the forces of gravity act upon the load carried in harness 32 the resultant shape is close to being idealistically flat. This is generally shown in FIGS. 2 and 3.

The entire width of canopy 20 is made up of cell clusters, one such cell cluster being between two laterally adjacent suspension lines 28. Such a cell cluster is shown in FIG. 2 in an enlarged view of the similar cell clusters in FIG. 1. Between laterally adjacent suspension lines 28 there is a cell cluster having a span width of 33. In that span there are two wedge cells 26, each immediately above a connection to suspension line 28, respectively. Approximately in the middle of span 33 is an inverted wedge cell 27, and in the spaces between inverted wedge cell 27 and each end wedge cell 26 there are two shear cells 34. This is a 7-cell cluster (2 cells 26, 4 cells 34, and 1 cell 27), even though it counts each cell 26 as being in that cluster when actually only one-half of each cell 26 is in this cluster, and the other half is assigned to the next contiguous cluster. Despite the mathematical inaccuracy of this nomenclature the cell cluster of FIG. 2 is called a "7-cell cluster". Thus, there are three 7-cell clusters in the canopy between the outermost suspension lines 28 of FIG. 1 although by actual count there are only 19 cells in that span of three clusters.

The same cluster is shown in FIG. 3 as it would appear if no weight were pulling down on suspension lines 28. When the weight is attached the cluster of FIG. 3 flattens out the cell cluster to the shape shown in FIG. 2. These differences are due to the presence of and the orientation of wedge cells 26 and inverted wedge cell 27. The shape and positioning of wedge cells 26 causes the next adjacent cells to turn downwardly in FIG. 2, and the presence of and orientation of inverted wedge cell 27 causes the next adjacent cells to turn upwardly. These distortions are opposite to the curving that would occur when suspension lines are attached to a weight. If all cells in the span 33 between suspension lines 28 in FIG. 2 were rectangular cells as is cell 35 in FIG. 4, the weight pulling down on lines 28 would cause all cells between suspension lines 28 in FIG. 2 to bend upward to form an arch between suspension lines 28 while the cells immediately adjacent to lines 28 would be pulled downwardly to form a U-shape. By placing wedge cells 26 in FIG. 2 at the point of attachment to suspension lines 28 the triangular walls of cell 26 tend to counteract the upward arch-forming forces. The use of shear cells 34 slanting in the same direction as the wall of wedge cell 26 also counteracts that arch-forming force. Finally, the use of an inverted wedge cell 27 in the center of span 33 also tends to counteract the arch-forming forces. The result is that the cell cluster generally holds a flat horizontal shape, even though slightly carved concave downwardly as in FIG. 2.

It will be seen that other wedge cells than the triangular cell 26 and the inverted triangular cell 27 may be used to accomplish the same result. Furthermore, for a specific application there may be a specific design of canopy 20 and arrangement of cells 24 that will best accomplish the purpose. Trapezoidal cell 36 and inverted trapezoidal cell 46, as well as Y-cell 37 and inverted Y-cell 40 are functional substitutes for triangular cell 26 and inverted triangular cell 27. FIGS. 11-14 show how Y-cells 37 and inverted Y-cells 40 are used and how adjoining cells may have to be modified to accommodate Y-cell 37 and inverted Y-cell 40. Especially useful with Y-cell 37 and inverted Y-cell 40 are keystone cell 38 and pointed keystone cell 39. Rectangular cell 35 is that which is generally used in the prior art, but it may also be useful in certain cell clusters of this invention.

Figure 15:
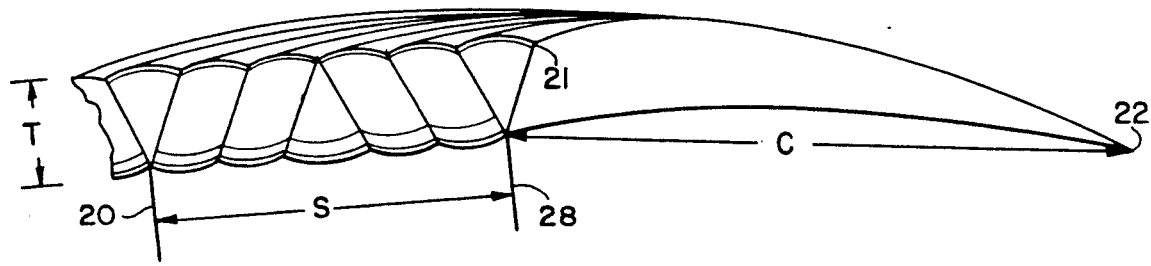
FIG. 15 is a perspective view of a cell cluster showing its span and its chord used in determining its aspect ratio.

Cell clusters, as shown in FIGS. 2 and 3, preferably contain from about 3 to about 11 cells 24, the exact number being a matter of design for specialized uses. A preferred limiting design factor is the "aspect ratio" which is illustrated in FIG. 15. A cell cluster has a lateral width S (frequently called the "span") between laterally adjacent suspension lines 28. The length from front to back or from leading edge 21 to trailing edge 22 of the cell cluster is the "chord" and shown as C in FIG. 15. The aspect ratio is the ratio of S:C which should be at least 0.5 with at least 5 cell clusters in a parachute span 49. The aspect ratio for the parachute is as least $0.5 \times 5$ or at least about 2.5, and preferably about 2.75-3.0. The thickness T of the cell cluster at leading edge 21 is not too critical, but generally should be kept as small as feasible in order to have a thin, maneuverable canopy with as little weight as possible. Generally, thickness T will be about 6-15 inches and will be about 10-20% of the chord length, C.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a ram air inflatable glidable parachute having a substantially horizontal canopy and a plurality of generally vertical suspension lines connecting said canopy to a pay load attachment means, said canopy having a horizontal top skin vertically spread above a horizontal bottom skin, said top and bottom skins being connected to each other by a plurality of tubular contiguous cells having generally an airfoil shape in longitudinal cross section extending from a leading edge to a trailing edge with an opening near said leading edge to permit air to flow into said cell from the surrounding atmosphere; the improvement which comprises said canopy cells being arranged in cell clusters of 2 or more contiguous cells between adjacent said suspension lines, the cells in each said cluster being mixtures of different cells each having the general lateral cross sectional shape of a polygon of 3-5 sides, said mixture of each said cluster including a first number of said cells having a first lateral cross sectional shape and a second number of said cells having a different second lateral cross sectional shape, the orientation and arrangement of said cells in said cell clusters and the canopy attachment positions of said suspension lines being such that when in use gliding through the air with said pay load suspended therebeneath said canopy is substantially horizontal.

2. The parachute of claim 1 wherein each of said first number of said cells in each said cluster includes at least one triangular cell having an apex, said canopy being connected to each said suspension line at said apex of said triangular cell wherein said apex is coincidental with said horizontal bottom skin.

3. The parachute of claim 2 wherein said cell cluster between adjacent suspension lines contains 3-9 cells including said triangular cell at each end of said cluster and each having a suspension line attached to its apex.

4. The parachute of claim 2 wherein a center of said cells in said cluster is a triangular cell with an apex at said horizontal top skin.

5. The parachute of claim 2 wherein the connection between said canopy and said suspension line additionally includes two branch support lines from said suspension line respectively between a first and second cell next adjacent to each lateral side of said apex.

6. The parachute of claim 1 wherein said suspension line is attached to said canopy at the junction of said horizontal bottom skin and a generally vertical wall skin between two said contiguous cells, said two contiguous cells having sandwiched therebetween adjacent said horizontal top skin another said cell defined as a small triangular cell having one side common with said top skin and an apex opposite from said one side coinciding with said vertical wall skin.

7. The parachute of claim 3 wherein a said center of said cells in said cluster is a small triangular cell having one side coincident with said horizontal bottom skin and the apex opposite to said one side coincident with a generally vertical wall skin separating two said contiguous cells at the center of said cell cluster.

8. The parachute of claim 3 wherein said center cell is a cell having a trapezoidal-shaped lateral cross section of two tapering sides and two generally parallel sides, one of which is longer and the other of which is shorter, said trapezoidal center cell being oriented with said shorter parallel side coincident with said horizontal top skin, said longer side coincident with said horizontal bottom skin and said tapering sides common with said wall skin separating said trapezoidal cell with the next contiguous cell, respectively.

9. The parachute of claim 3 wherein the number of said cells is an even number with the two center cells in said cluster each having a lateral cross section that is trapezoidal defined by a shorter side and a longer side parallel to each other and two tapering sides joining said shorter side and said longer side to each other by a common said tapering side and being oriented such that said longer side of each trapezoidal cell is coincident with said horizontal bottom skin.

10. The parachute of claim 1 which exhibits a cell cluster aspect ratio of at least about 0.5, said aspect ratio being defined as the ratio of the length of the span of a cell cluster to the length of the chord of said parachute canopy when inflated, said span being the lateral linear distance between two adjacent suspension lines and said chord being the longitudinal linear distance between said leading edge and said trailing edge.

11. The parachute of claim 10 wherein the aspect ratio of the entire parachute is about 2.75-3.0.

12. In a ram air inflatable glidable parachute having a generally horizontal canopy and a plurality of generally vertical suspension lines connected to said canopy and depending downwardly to a harness adapted to be fastened to a pay load; said canopy being a collapsible inflatable airfoil structure having a lateral leading edge, a lateral trailing edge, and an internal honeycomb structure of a single row of a plurality of longitudinal contiguous cells defined by a continuous horizontal top skin, a continuous horizontal bottom skin spaced downwardly from and generally parallel to said top skin, and a plurality of horizontal spaced vertical wall skins, each said cell having openings through one or more of said skins to permit the inflow of air from the surrounding atmosphere to maintain said structure in an inflated condition as it glides through said atmosphere; the improvement wherein said single row of contiguous cells includes a plurality of spaced wedge cells each having two adjacent said wall skins that are inclined so as to form a shorter convergent side and opposite thereto a longer divergent side when viewed in lateral cross section, interspersed with a plurality of nonwedge cells having substantially parallel adjacent said wall skins, both types of said cells being arranged in cell clusters and said canopy comprising a plurality of said clusters, each said cluster being joined to the next adjacent cluster through at least one said wedge cell oriented such that the longer divergent side thereof coincides with said horizontal top skin, and wherein said suspension lines are connected to said canopy at said horizontal bottom skin at the juncture of two adjacent said cell clusters.

13. The parachute of claim 12 which additionally includes at least one inverted wedge cell per said cell cluster, said inverted wedge cell having the same general lateral cross sectional shape of said wedge cell, but being oriented such that said longer divergent side coincides with said horizontal bottom skin.

14. The parachute of claim 13 wherein the number of and positioning of said wedge cells and said inverted wedge cells is such that when said canopy is inflated and atmospheric in gliding operation with said pay load attached to said harness, said top skin and said bottom skin are substantially horizontal.

15. The parachute of claim 12 having a cell cluster aspect ratio of at least 0.5 wherein said aspect ratio is defined as the ratio of the linear lateral distance between points of connection of adjacent said suspension lines to said canopy and the linear longitudinal distance between said leading edge and said trailing edge.

16. The parachute of claim 15 wherein said aspect ratio of the entire parachute is 2.75-3.0.

17. The parachute of claim 12 wherein the overall lateral dimension of said canopy includes 5-11 said cell clusters of 3-9 cells per cluster.

18. In a ram air inflatable glidable parachute having a generally horizontal canopy and a plurality of generally vertical suspension lines connected to said canopy and depending downwardly to a harness adapted to be fastened to a pay load, said canopy being a collapsible, inflatable airfoil structure having a lateral leading edge, a lateral trailing edge, and an internal honeycomb structure of a single row of a plurality of longitudinal contiguous cells defined by a continuous horizontal top skin, a continuous horizontal bottom skin spaced downwardly from and generally parallel to said top skin, and a plurality of horizontal spaced vertical wall skins, each said cell having openings through one or more of said skins to permit the inflow of air from the surrounding atmosphere to maintain said structure in an inflated condition as it glides through such atmosphere, the improvement wherein said single row of contiguous cells includes a plurality of spaced wedge cells each having two adjacent said wall skins that are inclined so as to form a shorter convergent side and opposite thereto a longer divergent side when viewed in lateral cross section, interspersed with a plurality of nonwedge cells having substantially parallel adjacent said wall skins, said wedge and nonwedge cells being arranged in cell clusters, a plurality of said clusters respectively being joined to the next adjacent cluster through at least one said wedge cell oriented such that the longer divergent side thereof coincides with said horizontal top skin, and said suspension lines being connected to said canopy at said horizontal bottom skin at the juncture of two adjacent said cell clusters.

19. The parachute of claim 18 further comprising at least one inverted cell in each said cell cluster, said inverted wedge cell having substantially identical cross sectional shape as said wedge cell, said inverted wedge cell being oriented with its said longer divergent side coincides with said horizontal bottom skin.

20. The parachute of claim 18 wherein said top and bottom skins are substantially horizontal by the placement of a sufficient number of said wedge and inverted wedge cells in each cluster when said canopy is inflated and atmospheric in gliding condition with its pay load attached to said harness.

* * * * *